United States Patent
Udagawa

(10) Patent No.: US 7,108,268 B2
(45) Date of Patent: Sep. 19, 2006

(54) METAL LAMINATE GASKET

(75) Inventor: Tsunekazu Udagawa, Ichikawa (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 10/963,653

(22) Filed: Oct. 14, 2004

(65) Prior Publication Data
US 2005/0093249 A1    May 5, 2005

(30) Foreign Application Priority Data
Oct. 30, 2003    (JP)    ............... 2003-370027

(51) Int. Cl.
*F02F 11/00*    (2006.01)
(52) U.S. Cl. ............... 277/593; 277/594; 277/595
(58) Field of Classification Search ........ 277/592–596, 277/600
See application file for complete search history.

(56) References Cited
U.S. PATENT DOCUMENTS

| | | | | |
|---|---|---|---|---|
| 4,739,999 A | | 4/1988 | Ishii et al. | |
| 4,807,892 A | * | 2/1989 | Udagawa | 277/595 |
| 4,898,396 A | * | 2/1990 | Udagawa | 277/592 |
| 5,058,908 A | * | 10/1991 | Udagawa | 277/595 |
| 5,076,595 A | * | 12/1991 | Udagawa | 277/595 |
| 5,255,926 A | * | 10/1993 | Udagawa | 277/595 |
| 5,549,307 A | * | 8/1996 | Capretta et al. | 277/595 |
| 5,560,623 A | * | 10/1996 | Yoshino | 277/595 |
| 5,961,126 A | * | 10/1999 | Miyaoh | 277/594 |
| 7,055,830 B1 | * | 6/2006 | Udagawa | 277/594 |

FOREIGN PATENT DOCUMENTS

JP    10-38086    2/1998

* cited by examiner

*Primary Examiner*—Patricia Engle
*Assistant Examiner*—Gilbert Lee
(74) *Attorney, Agent, or Firm*—Manabu Kanesaka

(57) ABSTRACT

A metal laminate gasket includes two surface plates, and an intermediate plate. The second surface plate has a folded-back piece folded back around a sealing hole and disposed on a first bead of the first surface plate surrounding the sealing hole. The first plate has a curved portion with a height higher than that of the folded-back piece and disposed adjacent to an outer peripheral edge of the folded-back piece. The curved portion has a crank shape section or a Z-character shape section. A second bead is provided in the intermediate plate adjacent to the curved portion.

5 Claims, 5 Drawing Sheets

METAL LAMINATE GASKET

BACKGROUND OF THE INVENTION AND RELATED ART STATEMENT

The invention relates to a metal laminate gasket having two surface plates and an intermediate plate and, more specifically, relates to a metal laminate gasket wherein a secondary sealing around a sealing hole is reinforced.

There has been a metal laminate gasket formed by laminating thin metal plates provided with sealing means as a gasket to be used at a connecting portion of a cylinder bead and a cylinder block of an internal combustion engine, other connecting portions of the internal combustion engine, a joint portion of pipes or the like.

In an internal combustion engine installed in an automobile, especially a small diesel engine, a size and weight of the engine have been reduced, and a cylinder head and a cylinder block have been made of an aluminum alloy and the like with a relatively low rigidity. Accordingly, along with an increase in an inner pressure of the cylinder due to a high energy output of the engine, a deformation of the cylinder head has been a problem.

The cylinder head has a small deformation in the vicinity of a tightening bolt, and the deformation increases as the distance from the tightening bolt increases and it increases toward a center of a cylinder bore where a large combustion pressure is applied.

In order to obtain a sufficient sealing ability while following the deformation of the cylinder head, it is necessary to provide not only a primary sealing but also a secondary sealing around the cylinder bore. Especially, in view of a local deformation around the cylinder bore, since the deformation at a central side is larger than that at an outer peripheral side, it is important to obtain a surface pressure distribution such that a sealing surface pressure is large at an inner side and decreases stepwise toward an outer side in order to follow an inclined deformation.

On the other hand, along with the reduction in size, and weight and cost of an engine, in a metal laminate gasket, the number of laminated plates has been reduced, and sealing means to be employed has been simplified. As a metal laminate gasket with a relatively simple structure, there has been a metal laminate gasket formed of two surface plates and an intermediate plate.

In such a metal laminate gasket formed of the three metal plates, several cylinder head gaskets with a secondary sealing reinforced stepwise have been tried in order to deal with a local deformation of a cylinder head and a cylinder block of a small engine.

In such cylinder head gaskets, a primary sealing is provided with respect to a sealing hole such as a cylinder bore, and a secondary sealing is provided outside the primary sealing, so that a surface pressure distribution of the secondary sealing becomes stepwise wherein a surface pressure becomes highest at inside and gradually decreases toward outside.

As an example, a metal laminate gasket shown in FIG. 6 and a metal laminate gasket shown in FIG. 7 have been developed.

In the metal laminate gaskets, a first bead is provided on an inner peripheral side of a step portion of a first surface plate to form a primary sealing, and a second surface plate is folded back to protect the first bead from high temperature combustion gas and the like. An outer peripheral edge of the folded back piece faces the step portion of the first surface plate.

Also, in order to form a secondary sealing, in the conventional gaskets shown in FIGS. 6 and 7, a secondary bead 71 (FIG. 6) is formed in an intermediate plate 70, or a shim 80 (FIG. 7) is disposed on an intermediate plate 70A. In order to dispose the intermediate plate 70 or 70A between a first surface plate 50 and a second surface plate 60, a step portion 52 is formed in the first surface plate 50 between the first bead 51 and the second bead 71, and the second bead 71 or the shim 80 is provided on an outer peripheral side of the step portion 52.

However, in the metal laminate gaskets 5 and 5A shown in FIGS. 6 and 7, the step portion 52 of the first surface plate 50 is gradually bent and the first bead portion 51 is located under a fold-back piece 61 of the second surface plate 60. Accordingly, when the gaskets 5 and 5A are tightened, it is difficult to generate a large surface pressure at the step portion 52.

As a result, with the secondary sealing reinforcing method, as shown in FIGS. 6 and 7, a surface pressure distribution P becomes a mountain-type in which a surface pressure increases at a central portion or a rectangular-type in which a surface pressure becomes flat. In a recent cylinder head having a relatively small rigidity, a center of a cylinder bore 2 separates from a cylinder block 9 as shown in FIG. 8. Accordingly, a deformation decreases toward outside the cylinder bore 2, i.e. an inclined deformation, thereby making it difficult to obtain a sufficient sealing.

On the other hand, the present inventor has proposed a metal laminate gasket in which a first surface plate is folded in a step shape to form a curved portion with a crank shape section or Z-character shape section at a step portion of the first surface plate adjacent to a folded portion of a second surface plate, so that a large sealing surface pressure is generated at the step portion. It is intended to apply this structure to the present invention (for example, refer to Patent Document 1).

Patent Document 1; Japanese Patent Publication (Kokai) No. 10-38086

In view of the problems described above, the present invention has been made, and an object of the present invention is to provide a metal laminate gasket capable of generating a primary sealing with a first bead disposed in a folded-back piece around a sealing hole and a secondary sealing disposed around the primary sealing and having a surface pressure distribution decreasing stepwise from inside to outside.

Further objects and advantages of the invention will be apparent from the following description of the invention.

SUMMARY OF THE INVENTION

In order to attain the objects described above, according to the invention, a metal laminate gasket is structured as follows:

1) A metal laminate gasket is formed of two surface plates and an intermediate plate. A second surface plate is folded back around a sealing hole to form a folded-back piece, and the folded-back piece is laminated on a first bead surrounding a sealing hole of a first surface plate. The first surface plate is bent in a crank shape section or a Z-character shape section to form a curved portion 12 adjacent to an outer peripheral edge of the folded-back piece and having a height higher than that of the folded-back piece. The intermediate plate is provided with a second bead adjacent to the curved portion.

The first bead and the second bead are generally formed of full beads, and are not limited thereto. The first bead and the second bead may be formed of half beads, or a combination of a half bead and a full bead.

Incidentally, the crank shape is defined such that bent angles of upper and lower bent portions are substantially a right angle. The Z-character shape is defined such that bent angles of upper and lower bent portions are larger than 90 degrees, and the bent portions may have a round shape (R).

As shown in FIG. 3, a curve height H2 of the curved portion 12 is higher than a height H1 of the folded-back piece by ΔH. When the gasket is tightened, the curved portion 12 is compressed between an outer peripheral edge 21a of the folded-back piece 21 and a second bead 31, and a reaction force is generated against compression of the curved portion 12. Accordingly, a high surface pressure is generated at this portion for improving a sealing ability. The curve height H2 and the step ΔH are suitably selected or set to obtain a required surface pressure.

With the structure described above, the first bead of the first surface plate can form a primary sealing. It is possible to determine a size and distribution of a surface pressure generated by the primary sealing through a material of the first surface plate and a shape of the first bead. The folded-back piece of the second surface plate can protect the first bead from a combustion gas and the like.

The curved portion of the first surface plate can generate a large surface pressure, and the surface pressure can be continued to a surface pressure generated by the second bead of the intermediate plate. The surface pressure generated at the curved portion is determined by a material of the first metal plate and a shape of the curved portion, and the surface pressure continued thereto is determined by a material of the intermediate plate and a shape of the second bead.

2) Further, the first surface plate is provided with a third bead formed of a half bead surrounding an outer periphery of the second bead.

With the structure described above, the second bead of the intermediate plate is held between the step portion of the first surface plate and the third bead to generate a large surface pressure at this portion. The surface pressure is determined by not only a material of the intermediate plate and a shape of the second bead, but also a material of the first surface plate, a shape of the third bead, and a positional relationship of the third bead and the second bead. Especially, with the third bead, it is possible to prevent the surface pressure from changing gradually at an outer peripheral side of the secondary sealing, thereby improving sealing effect.

3) In the metal laminate gasket described above, the intermediate plate is formed of spring steel. With this structure, it is possible to prevent creep of the secondary sealing and effectively provide spring action to the second bead.

As described above, according to the metal laminate gasket of the invention, it is possible to generate the first sealing with the first bead disposed in the folded-back piece surrounding the sealing hole and the second sealing around the first sealing having a surface pressure distribution decreasing stepwise from inside to outside.

It is possible to determine the size and distribution of the surface pressure generated at the primary sealing through a material of the first surface plate and a shape of the first bead. Further, it is possible to determine the size and distribution of the surface pressure generated at the secondary sealing by the curved portion of the first surface plate and the second bead of the intermediate plate through a material of the first metal plate, the curved portion of the first metal plate, a material of the intermediate plate, and a shape of the second bead.

Therefore, with respect to a cylinder head and the like having a relatively small rigidity where a center of a cylinder bore is away from a cylinder block and an inclined deformation gradually decreasing toward outside the cylinder bore is generated, it is possible to form the sufficient secondary sealing, that is, the secondary sealing having the effective surface pressure distribution wherein the surface pressure is high at a side of the sealing hole and decreases stepwise toward outside.

BRIEF DESCRIPTION OF THE DRAWINGS

FIGS. 5(a) to 5(d) are sectional views showing metal laminate gaskets according to other embodiments of the invention, wherein FIG. 5(a) is an example of a first bead formed of a half bead, FIG. 5(b) is an example of a second bead formed of a half bead, FIG. 5(c) is an example of a first bead and a second bead formed of a half bead, respectively, and FIG. 5(d) is an example of a curved portion formed in a Z-character shape;

DETAILED DESCRIPTION OF PREFERRED EMBODIMENT

Hereunder, embodiments of a metal laminate gasket according to the present invention will be explained with reference to the accompanying drawings. Incidentally, FIGS. 1 to 7 are explanatory schematic views, wherein a plate thickness, dimensions of a bead and a sealing groove, and a length-to-width ratio of the metal gasket are different from actual ones to exaggerate a sealing portion for easy understanding.

Figure 1:
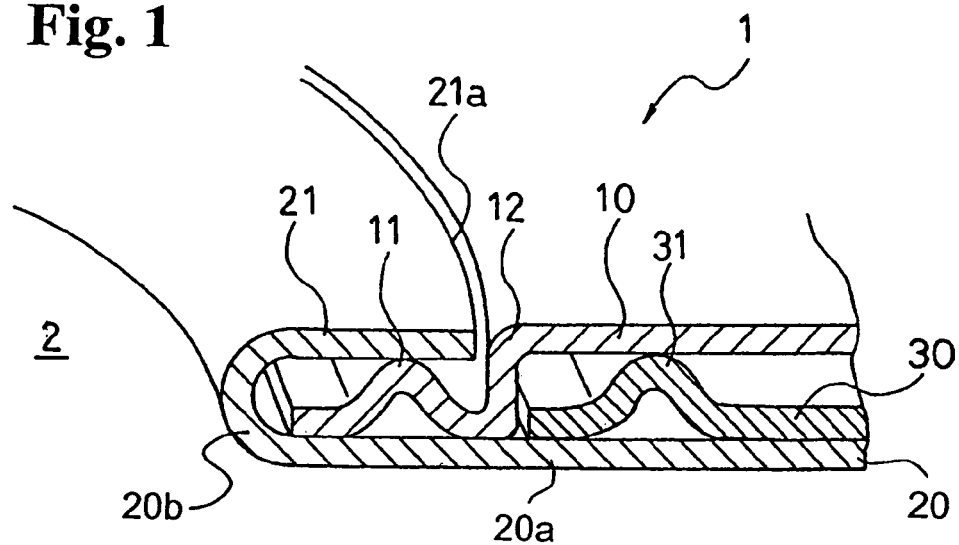
FIG. 1 is a partial perspective view having a section showing a metal laminate gasket according to a first embodiment of the invention.
Figure 2:
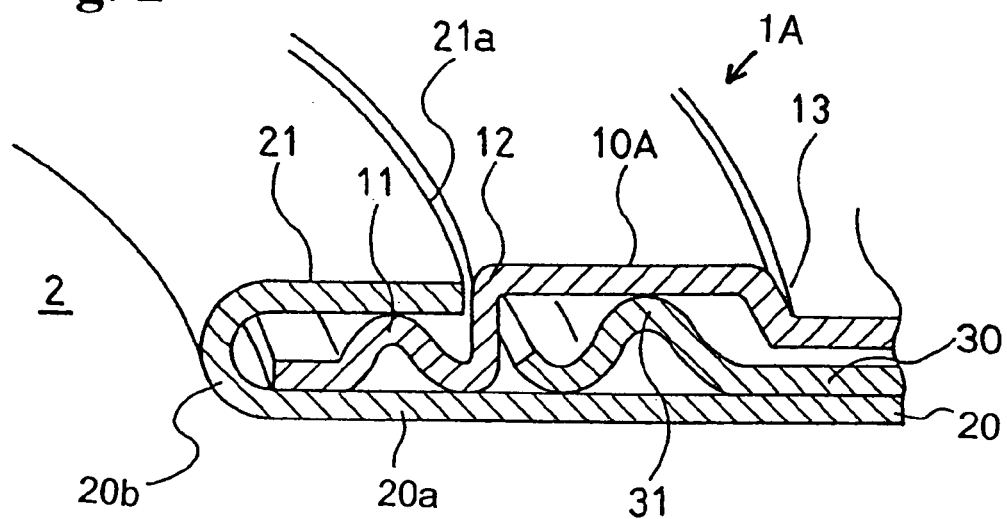
FIG. 2 is a partial perspective view having a section showing a metal laminate gasket according to a second embodiment of the invention.

Metal laminate gaskets 1 and 1A of the present invention shown in FIGS. 1 and 2 are installed between a cylinder head and a cylinder block (cylinder body) of an engine for sealing combustion gas of a cylinder bore having a high temperature and high pressure, and liquid such as cooling water and oil passing through a cooling water path and a cooling oil path.

According to first and second embodiments, the metal laminate gasket 1 (1A) is formed of three constituting plates, i.e. a first surface plate 10 (10A), a second surface plate 20, and an intermediate plate 30. The first surface plate 10 (10A) and the second surface plate 20 are formed of a soft steel plate, an annealed stainless material, and the like. The intermediate plate 30 is formed of a spring steel plate.

In the metal laminate gasket 1 of the first embodiment shown in FIG. 1, the first surface plate 10 includes a first bead (full bead) 11 surrounding a sealing hole 2, and a curved portion 12 provided on an outer peripheral side of the first bead 11 and curved in a step shape with a crank-shape section or Z-character shape section.

The intermediate plate 30 includes a second bead (full bead) 31 surrounding an outer periphery of the curved portion 12 of the first surface plate 10.

The second surface plate 20 laminated with the intermediate plate 30 and the first surface plate 10 includes a base portion 20a, a bent portion 20b and a folded-back piece 21. Namely, the second surface plate 20 is folded back around a sealing hole 2, so that the folded-back piece 21 covers the first bead 11, and an outer peripheral edge 21a of the folded-back piece 21 is formed adjacent to the curved portion 12.

Figure 3:
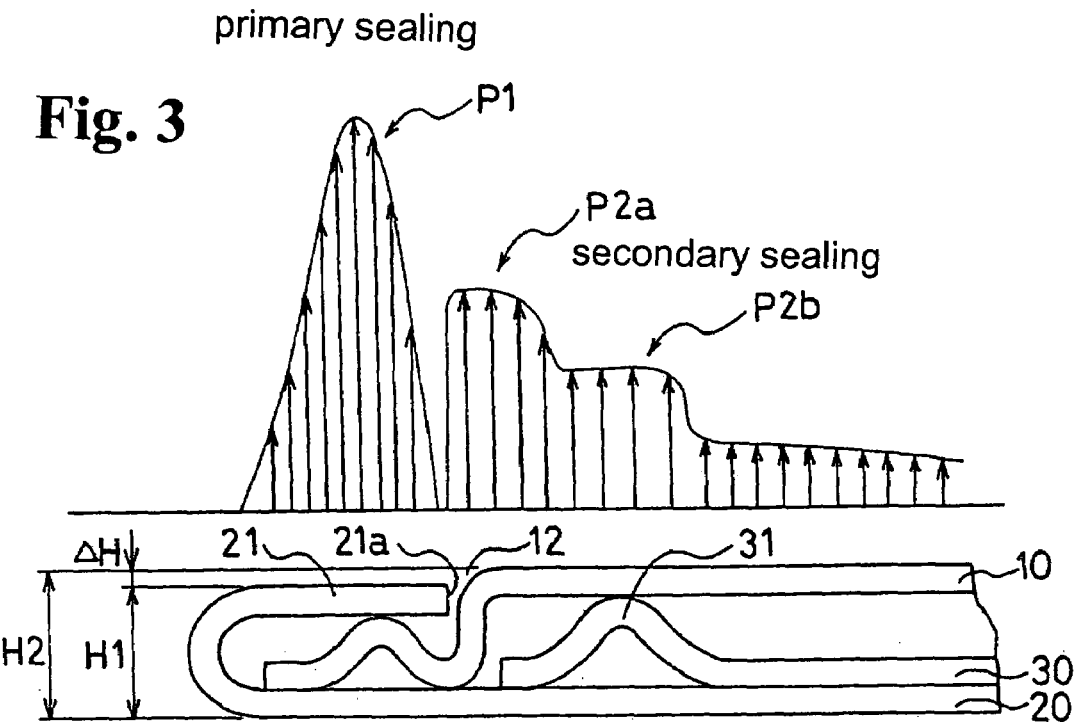
FIG. 3 is a schematic view showing a sealing surface pressure distribution of the metal laminate gasket according to the first embodiment of the invention.

At this time, as shown in FIG. 3, a curved height H2 of the curved portion 12 is slightly higher than a surface height H1 of the folded-back piece 21 by a value ΔH in the order of, for example, 0.2 to 0.5 mm. With the structure, when the gasket is tightened, the curved portion 12 is compressed so that a high surface pressure can be generated at this portion as shown by arrows P2a in FIG. 3.

According to the metal laminate gasket with the structure described above, a primary sealing can be formed by the first bead 11 of the first surface plate 10, and a favorable secondary sealing can be formed such that a large surface pressure is generated by the curved portion 12 of the first surface plate 10 and the large surface pressure is continued to a surface pressure generated at the second bead 31 of the intermediate plate 30.

A size and distribution P1 of the surface pressure generated at the primary sealing are set by a material of the first surface plate 10 and a shape (plate thickness; type, width, and height of a bead; etc.) of the first bead 11.

In the secondary sealing, a surface pressure P2a generated at the curved portion 12 is determined by a material of the first surface plate 10 and a shape (plate thickness, curved height, inclination of the step portion, etc.) of the curved portion 12, and a surface pressure P2b continued thereto is determined by a material of the intermediate plate 30 and a shape (plate thickness; type, width and height of the bead; etc.) of the second bead 31, respectively.

Therefore, in a recent cylinder head having a relatively small rigidity, in which a center of the cylinder bore is moved away from a cylinder block and this inclined deformation gradually decreases toward outside of a cylinder bore, it is possible to generate the effective secondary sealing. More specifically, in the case that the inclined deformation is generated, it is possible to generate the effective secondary sealing, that is, the secondary sealing having the favorable surface pressure distribution shown in FIG. 3 wherein the surface pressure is large at a side of the sealing hole and decreases stepwise toward outside.

Moreover, the first bead 11 is protected by the folded-back piece 21 of the second metal plate 20, and the second bead 31 is protected by the first surface plate 10 having the curved portion 12. Accordingly, it is possible to provide a gasket with superior durability capable of maintaining a favorable sealing surface pressure distribution for a long time. In the second embodiments the metal laminate gasket 1A shown in FIG. 2 is provided with a third bead 13 formed of a half bead surrounding an outer periphery of the second bead 31. In other words, the second bead 31 is sandwiched between the third bead 13 and the curved portion 12.

A relationship between the third bead 13 and the curved portion 12, from a different view point, constitutes a wide bead, and the second bead is disposed in the wide bead.

Figure 4:
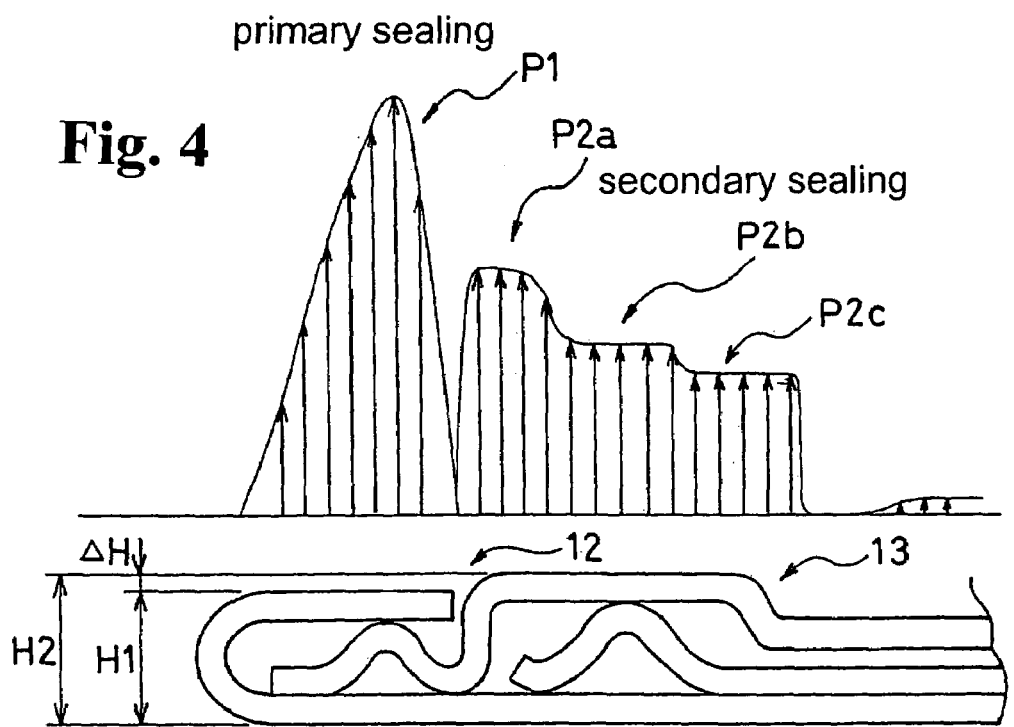
FIG. 4 is a schematic view showing a sealing surface pressure distribution of the metal laminate gasket according to the second embodiment of the invention.

In the structure described above, the surface pressure P2c can be generated by the third bead 13 as shown in FIG. 4, in addition to the surface pressure P2a generated at the curved portion 12 and the surface pressure P2b generated at the second bead 31. Accordingly, it is possible to obtain the surface pressure distribution in a wide area, thereby improving sealing effect.

FIGS. 5(a) to 5(d) are views showing metal laminate gaskets according to other embodiments.

Figure 5A:
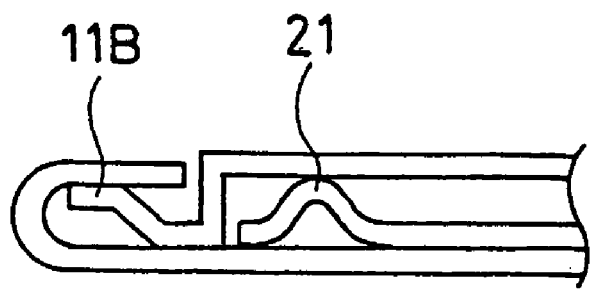
Figure 5B:
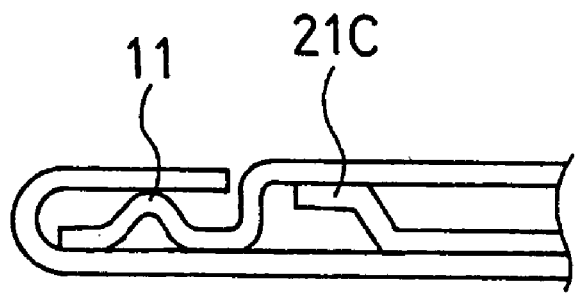
Figure 5C:
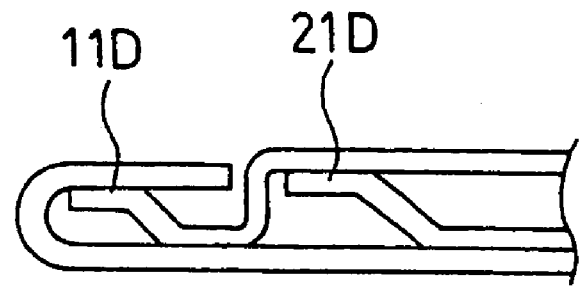
Figure 5D:
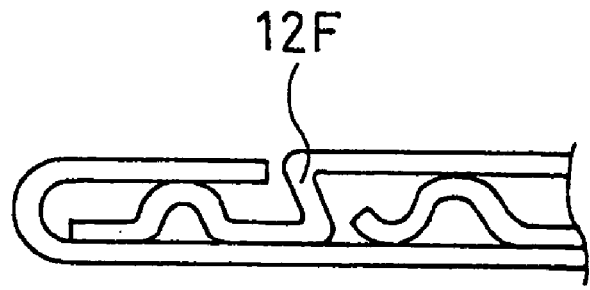
Figure 6:
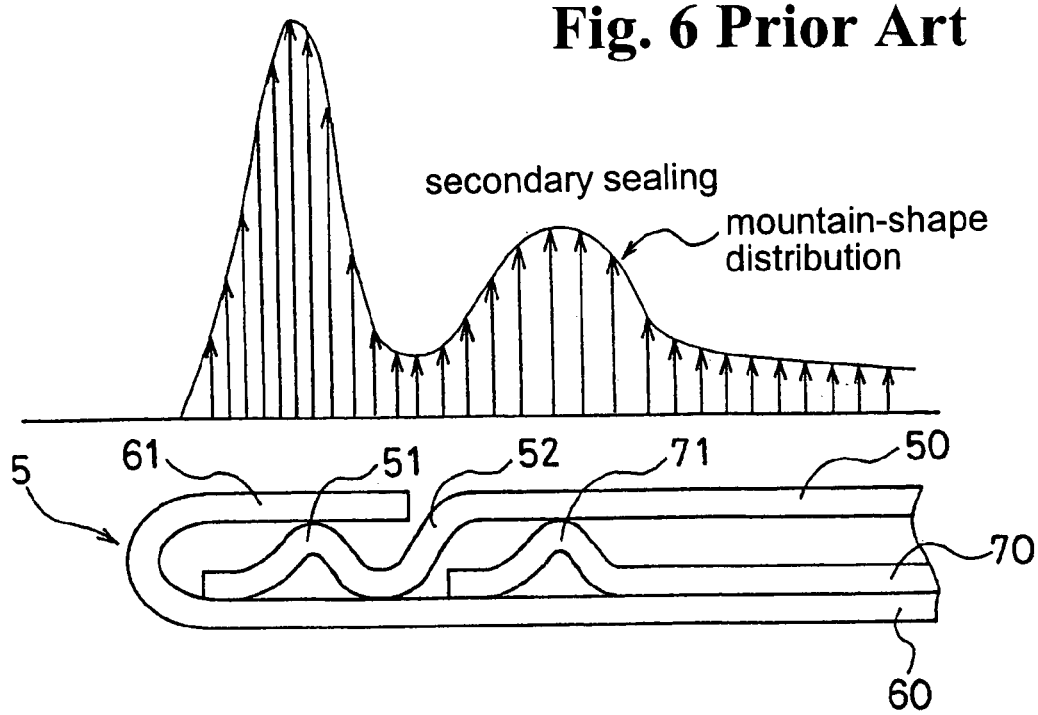
FIG. 6 is a schematic view showing a sealing surface pressure distribution of a metal laminate gasket before improvement.
Figure 7:
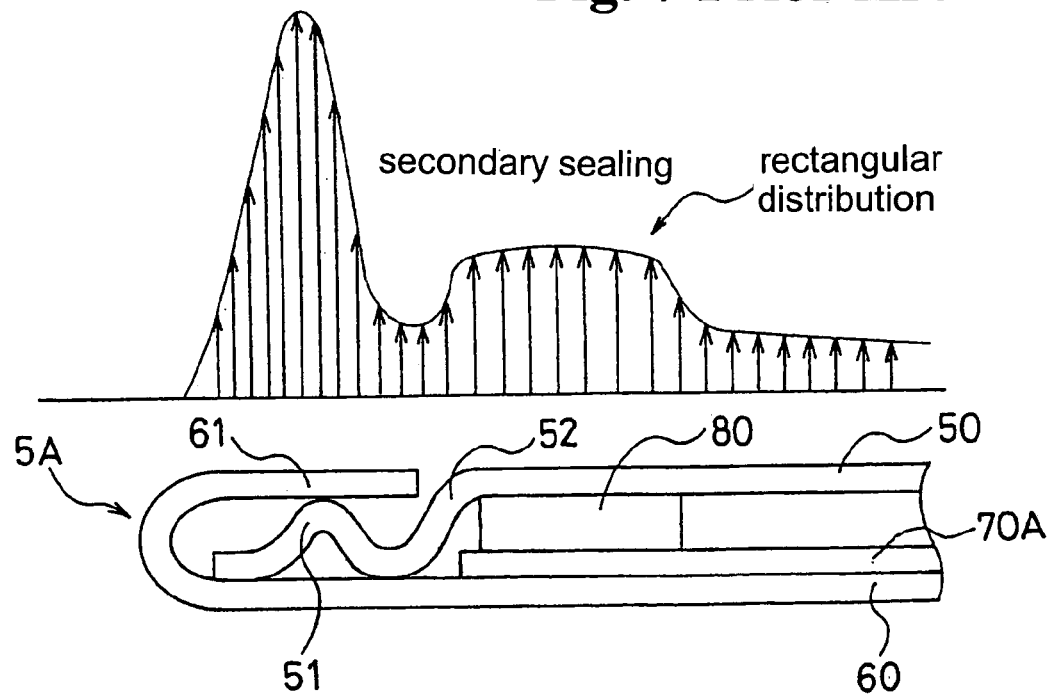
FIG. 7 is a schematic view showing a sealing surface pressure distribution of another metal laminate gasket before improvement.
Figure 8:
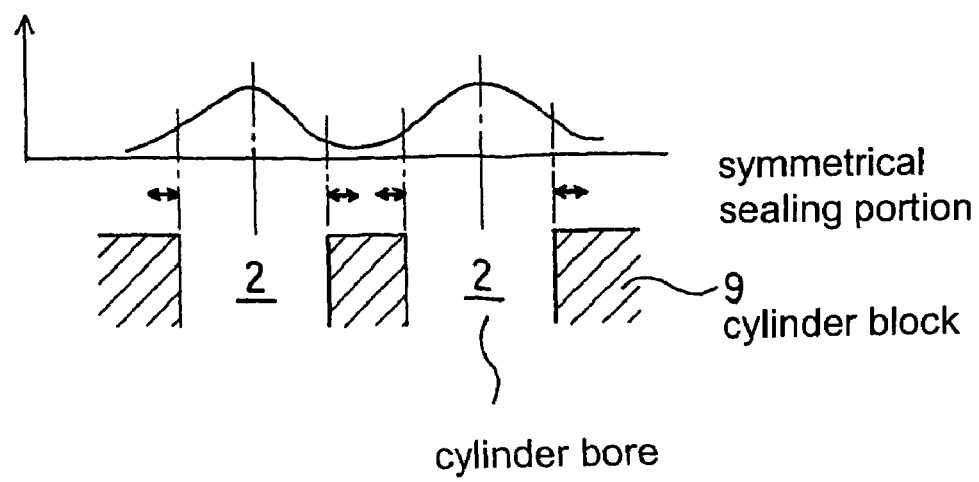
FIG. 8 is a perspective view showing a deformation amount of a cylinder head.

FIG. 5(a) shows an example wherein a first bead 11B is formed of a half bead, and a second bead 21 is formed of a full bead. FIG. 5(b) shows an example wherein a first bead 11 is formed of a full bead, and a second bead 21C is formed of a half bead. FIG. 5(c) shows an example wherein a first bead 11D and a second bead 21D are formed of half beads, respectively. FIG. 5(d) shows an example wherein a curved portion 12F is formed in a Z-character shape.

The disclosure of Japanese Patent Application No. 2003-370027, filed on Oct. 30, 2003, is incorporated in the application.

While the invention has been explained with reference to the specific embodiments of the invention, the explanation is illustrative and the invention is limited only by the appended claims.

What is claimed is:

1. A metal laminate gasket comprising:
    a first surface plate having a hole and a first bead around the hole,
    a second surface plate having a base portion disposed under the first surface plate, a bent portion located in the hole, and a folded-back piece extending from the bent portion and located above the first bead,
    an intermediate plate disposed between the first surface plate and the base portion of the second surface plate, and having a second bead surrounding the hole, and
    a curved portion formed in the first surface plate adjacent to an outer peripheral edge of the folded-back piece and the first bead, said curved portion having a crank shape section such that bent angles of upper and lower bent portions of the first surface plate are substantially 90 degrees and a height higher than that of the folded-back piece so that the first bead, the curved portion and the second bead provide three sealing pressures gradually decreasing outwardly from the hole.

2. A metal laminate gasket as claimed in claim 1, wherein said first surface plate further includes a half bead outside the curved portion to sandwich the second bead between the curved portion and the half bead.

3. A metal laminate gasket as claimed in claim 1, wherein said intermediate plate is made of a spring steel material.

4. A metal laminate gasket as claimed in claim 1, wherein said first and second beads are selected from a full bead and a half bead.

5. A metal laminate gasket comprising:
    a first surface plate having a hole and a first bead around the hole,
    a second surface plate having a base portion disposed under the first surface plate, a bent portion located in the hole, and a folded-back piece extending from the bent portion and located above the first bead,
    an intermediate plate disposed between the first surface plate and the base portion of the second surface plate, and having a second bead surrounding the hole, and
    a curved portion formed in the first surface plate adjacent to an outer peripheral edge of the folded-back piece and the first bead, said curved portion having a crank shape section such that bent angles of upper and lower bent portions of the first surface plate are substantially 90 degrees and a height higher than that of the folded-back piece so that the first bead, the curved portion and the second bead provide three sealing pressures gradually decreasing outwardly from the hole,
    wherein said sealing pressure formed by the curved portion is substantially separated from the sealing pressure formed by the first bead, and continues to the sealing pressure formed by the second bead.

* * * * *